(12) United States Patent
Watanabe

(10) Patent No.: US 10,498,969 B2
(45) Date of Patent: Dec. 3, 2019

(54) IMAGE PICKUP APPARATUS, CONTROL APPARATUS, AND EXPOSURE CONTROL METHOD

(71) Applicant: CANON KABUSHIKI KAISHA, Tokyo (JP)

(72) Inventor: Tatsuya Watanabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/691,582

(22) Filed: Aug. 30, 2017

(65) Prior Publication Data

US 2018/0069997 A1    Mar. 8, 2018

(30) Foreign Application Priority Data

Sep. 6, 2016   (JP) .................. 2016-173831

(51) Int. Cl.
| | |
|---|---|
| *H04N 5/235* | (2006.01) |
| *G03B 7/00* | (2014.01) |
| *G06T 7/13* | (2017.01) |
| *H04N 5/225* | (2006.01) |
| *H04N 5/232* | (2006.01) |
| *H04N 9/73* | (2006.01) |

(52) U.S. Cl.
CPC ............ *H04N 5/2352* (2013.01); *G06T 7/13* (2017.01); *H04N 5/2259* (2013.01); *H04N 5/23296* (2013.01); *H04N 9/735* (2013.01)

(58) Field of Classification Search
CPC .... H04N 5/235; H04N 5/2353; H04N 5/2352; H04N 5/23296; H04N 5/2259; H04N 5/23299; G06T 7/13
See application file for complete search history.

(56) References Cited

U.S. PATENT DOCUMENTS

| | | | | |
|---|---|---|---|---|
| 2002/0012065 A1* | 1/2002 | Watanabe | ............ | H04N 5/2351 348/364 |
| 2010/0118162 A1* | 5/2010 | Saijo | .................. | H04N 5/23203 348/231.6 |
| 2011/0292227 A1* | 12/2011 | Nakazawa | ............. | G03B 35/10 348/218.1 |

(Continued)

FOREIGN PATENT DOCUMENTS

| | | |
|---|---|---|
| JP | 2002-218506 A | 8/2002 |
| JP | 3938833 B2 | 6/2007 |

*Primary Examiner* — Kelly L Jerabek

(74) *Attorney, Agent, or Firm* — Canon U.S.A., Inc. IP Division

(57) ABSTRACT

An apparatus includes an image pickup unit that generates an image signal by shooting an object when light from the object is focused on an image pickup element by a lens unit, an image processing unit that generates an image from the image signal, an edge detection unit that detects an edge based on a window frame of an accessory accommodating the apparatus in the image, a calculation unit that determines an area on the basis of edge information and obtain a central position of the area, a lens driving unit including an adjustment unit that drives the lens unit and adjusts a zooming position such that the area is adjusted with respect to an image shooting range and a storage unit that stores the adjusted zooming position, and an exposure adjustment unit that performs an exposure adjustment in the image at the at least one adjusted zooming position.

20 Claims, 9 Drawing Sheets

(56) References Cited

U.S. PATENT DOCUMENTS

2012/0062754 A1\* 3/2012 Huang ............... H04N 5/23248
                                                        348/208.99
2014/0210707 A1\* 7/2014 Holz ....................... G06F 3/017
                                                        345/156

\* cited by examiner

IMAGE PICKUP APPARATUS, CONTROL APPARATUS, AND EXPOSURE CONTROL METHOD

BACKGROUND OF THE INVENTION

Field of the Invention

The aspect of the embodiments relates to a technology for an exposure control, and the aspect of the embodiments particularly relates to an image pickup apparatus such as a camera to which the technology for the exposure control is applied, a control apparatus, and an exposure control method.

Description of the Related Art

In recent years, for the purpose of monitoring, a use case has been suggested where police or the like puts a camera in an accessory and shoots a target from a limited shooting area. For example, a box, a pole, or the like is used as the above-described accessory, and the limited shooting area refers to a shooting window provided to the accessory (hereinafter, which will be abbreviated as a window) (see FIG. 12). However, various specifications of the accessories are proposed, and a variety of shapes and sizes of the windows and the like exist. Thus, a combination of those factors to be adopted is not identified for using the image pickup apparatus. For this reason, a part out of the window of the accessory may enter a shooting range, which is impeditive when an appropriate exposure is set for the image pickup apparatus with respect to the object in some cases.

An example of a method of solving the above-described issue includes a method of performing an exposure control by excluding an unwanted part in a shot image from an evaluation part. Japanese Patent Laid-Open No. 2002-218506 describes measures with respect to vignetting generated when a stereo adapter is mounted to the image pickup apparatus. At this time, in a case where an image is formed on an image pickup element via the stereo adapter, an area where the image is not formed is generated in a part of the image pickup element because of parallax. Thus, the measures are taken by adopting a method of removing this area from a photometry area.

In addition, as another example, a method of detecting an object and changing an exposure control in a case where an area having a large luminance difference exists in a shot image. According to Japanese Patent No. 3938833, in a case where a high luminance part exists in the shot image, the presence or absence of the object is determined on the basis of the number of high luminance pixels in a divided area determined in accordance with a shooting format, and the exposure control is changed.

SUMMARY OF THE INVENTION

In view of the above-described circumstances, an apparatus according to an aspect of the embodiments includes: an image pickup unit configured to shoot an object when light from an object is focused on an image pickup element by a lens unit and generate an image signal; an image processing unit configured to generate an image from the image signal of the image pickup unit; an edge detection unit configured to detect an edge based on a window frame of an accessory that accommodates the apparatus in the image; a calculation unit configured to determine an area based on information of the edge and obtain a central position of the area; a lens driving unit including an adjustment unit configured to drive the lens unit and adjust a zooming position in a manner that the area is matched with or contained in a shooting range of the image or the area covers the shooting range of the image and a storage unit configured to store the adjusted zooming position; and an exposure adjustment unit configured to perform an exposure adjustment in the image at the at least one adjusted zooming position.

In addition, in the view of the above-described circumstances, an apparatus according to another aspect of the embodiments includes: an image pickup unit configured to shoot an object when light from an object is focused on an image pickup element by a lens unit and generate an image signal; an image processing unit configured to generate an image from the image signal of the image pickup unit; an edge detection unit configured to detect an edge based on a window frame of an accessory that accommodates the apparatus in the image; a display unit configured to display the image for a user to set a temporary frame in the image by taking information of the edge into account; an input interface configured to perform an input of information of the temporary frame by the user; a calculation unit configured to obtain a central position in the temporary frame; a lens driving unit including an adjustment unit configured to drive the lens unit and adjust a zooming position in a manner that the temporary frame is matched with or contained in a shooting range of the image or the temporary frame covers the shooting range of the image and a storage unit configured to store the adjusted zooming position; and an exposure adjustment unit configured to perform an exposure adjustment in the image at the at least one adjusted zooming position.

Moreover, in the view of the above-described circumstances, a method according to still another aspect of the embodiments includes shooting an object when light from an object is focused on an image pickup element by a lens unit and generating an image signal, generating an image from a signal of the image pickup element, detecting an edge based on a window frame of an accessory that accommodates an image pickup apparatus in the image, determining an area based on information of the edge and obtaining a central position of the area, driving the lens unit and adjusting a zooming position in a manner that the area is matched with or contained in a shooting range of the image or the area covers the shooting range of the image, storing the adjusted zooming position, and performing an exposure adjustment in the image at the adjusted zooming position.

Further features of the disclosure will become apparent from the following description of exemplary embodiments with reference to the attached drawings.

DESCRIPTION OF THE EMBODIMENTS

An exposure control method according to an exemplary embodiment of the disclosure can be applied, for example, to a technology of an exposure control when an image pickup apparatus such as a camera to which a panning/tilting/zooming device is mounted is put in an accessory and used. Herein, the method includes obtaining a central position of an area determined on the basis of information of an edge by a window frame of the accessory that accommodates the image pickup apparatus detected in a generated image. Then, a lens unit is driven, and a zooming position is adjusted such that a shooting range of an image is appropriately adjusted with respect to the above-described area to perform the exposure control in the image at the adjusted zooming position.

Hereinafter, exemplary embodiments and examples of the disclosure will be described in detail with reference to the accompanying drawings.

First Exemplary Embodiment

Figure 1:
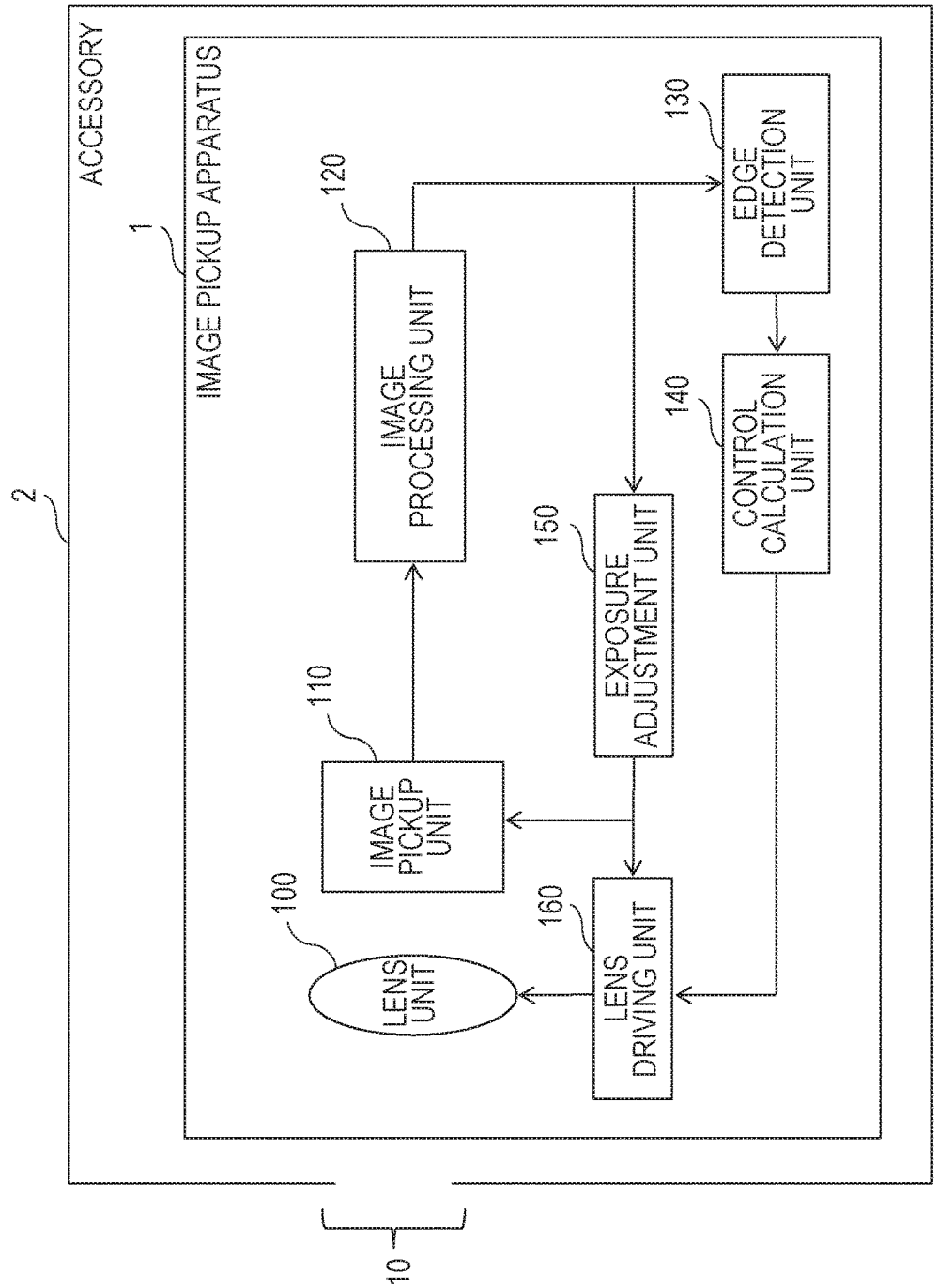
FIG. 1 illustrates an overall configuration according to a first exemplary embodiment.

As illustrated in FIG. 1, an image pickup apparatus 1 according to a first exemplary embodiment of the disclosure includes a lens unit 100, an image pickup unit 110, an image processing unit (video processing unit) 120, an edge detection unit 130, a control calculation unit 140, an exposure adjustment unit 150, and a lens driving unit 160. Descriptions will be given of the exposure control in a case where a shape of a window 10 of an accessory 2 and a shape of a shooting frame (shooting range of an image) are matched with each other in the image pickup apparatus 1 having the above-described configuration. Herein, being matched with each other means being similar figures, but in a case where the shapes are not similar figures, for example, the following process is performed. That is, at the time of an adjustment of a zooming position which will be described below, the adjustment is performed by setting a shooting frame to be inscribed with at least a part of a window frame and to be contained therein or setting the shooting frame to be circumscribed with at least the part of the window frame to cover the window frame. In the case of the latter process, the exposure adjustment is performed by the same method as a second exemplary embodiment which will be described below. Alternatively, the adjustment of the zooming position is performed with respect to the window frame that is not the similar figure by setting a temporary frame to be inscribed with at least the part of the window frame to be contained therein or setting the temporary frame to be circumscribed with at least the part of the window frame to cover the window frame so as to match the shooting frame with this temporary frame. In the case of the latter process, the same concept as the second exemplary embodiment which will be described below is adopted. It should be noted that, in the adjustment of the zooming position, the zooming position may be adjusted to be at a position between the adjustment position where the shooting frame is inscribed with at least the part of the window frame to be contained therein and the adjustment position where the shooting frame is circumscribed with at least the part of the window frame to cover the window frame.

An image of a scene shot by the image pickup apparatus 1 is formed on an image pickup element of the image pickup unit 110 via the lens unit 100. A panning/tilting/zooming drive apparatus is mounted to the lens unit 100, and a position of the lens unit 100 is changed by the panning/tilting/zooming drive apparatus in accordance with a control signal from the lens driving unit 160. According to the configuration of FIG. 1, a mode is illustrated in which the lens unit 100 is contained in the image pickup apparatus 1, but an interchangeable lens connected to an outer side of the image pickup apparatus 1 may also be used.

The image pickup unit 110 includes an image pickup element and an analog-to-digital (A/D) conversion circuit (both of which are not illustrated) and the like. The image pickup element outputs an analog signal in accordance with light focused by the lens unit 100. This analog signal is converted into a digital signal by the A/D conversion circuit and transmitted to the image processing unit 120 as an image signal. The image processing unit 120 performs image processing such as, for example, development processing, filter processing, sensor correction, or noise reduction on the image signal received from the image pickup unit 110. The image signal to which the image processing is applied is transmitted to the edge detection unit 130 and the exposure adjustment unit 150 by the image processing unit 120. The edge detection unit 130 detects an edge in the image on the basis of the image signal received from the image processing unit 120. An example of detection method of the edge includes, for example, a method of using a luminance difference between adjacent pixels. It should be noted however that an edge detection for grasp a frame of the window 10 is performed herein instead of a general edge detection. A detail thereof will be described with reference to a sequence below. The edge detection unit 130 transmits the image signal received from the image processing unit 120 and detection information of the edge to the control calculation unit 140.

The control calculation unit 140 generates a control signal to the lens driving unit 160 on the basis of the detection information of the edge. Specifically, information of a movement amount in a panning/tilting/zooming direction is generated. The exposure adjustment unit 150 performs an image adjustment from the image signal to which the above-described image processing has been applied such as, for example, evaluations on an aperture of the lens unit 100, an exposure time of the image pickup unit 110, or an A/D conversion and transmits a controls signal to the image pickup unit 110 and the lens driving unit 160 on the basis of the result.

The lens driving unit 160 adjusts the aperture/focus of the lens unit on the basis of the control signal received from the exposure adjustment unit 150 and also performs respective adjustments on panning/tilting/zooming/rolling positions on the basis of the control signal received from the control calculation unit 140. While the above-described series of operations is repeated, the adjustment is performed so as to set an appropriate exposure.

The accessory 2 has, for example, a shape of a box or a pole and is used while the image pickup apparatus 1 is contained therein. The window 10 is a window for the image pickup apparatus 1 to shoot an outside scene from the inside of the accessory 2. For example, glass or acrylic is used for the window 10. According to the present exemplary embodiment, the window 10 has the same rectangular shape as a shooting frame 1a.

According to the present exemplary embodiment, the image pickup apparatus 1 is a digital camera configured to obtain a moving image. For example, the image pickup apparatus 1 is a monitoring camera configured to transmit the obtained moving image to an external part. For this reason, the image pickup apparatus 1 is provided with an external interface (I/F) which is not illustrated in the drawing and outputs the thus obtained picked up image or various information in the image pickup apparatus 1 to the external part. Output destinations include an external control apparatus, a recorder, an external analysis apparatus (such as an image recognition apparatus), and the like. It should be noted that various data, the image signal, and the like can be input from an external apparatus such as the other the image pickup apparatus. Alternatively, the image pickup apparatus 1 is connected to an external computer provided with a user interface via a computer or the internet through the external I/F and can obtain necessary information and control commands via the computer or directly through the internet. It should be noted that the external I/F is not limited to a wired connection, and a wireless connection based on a predetermined standard such as wireless LAN may be used.

Figure 2:
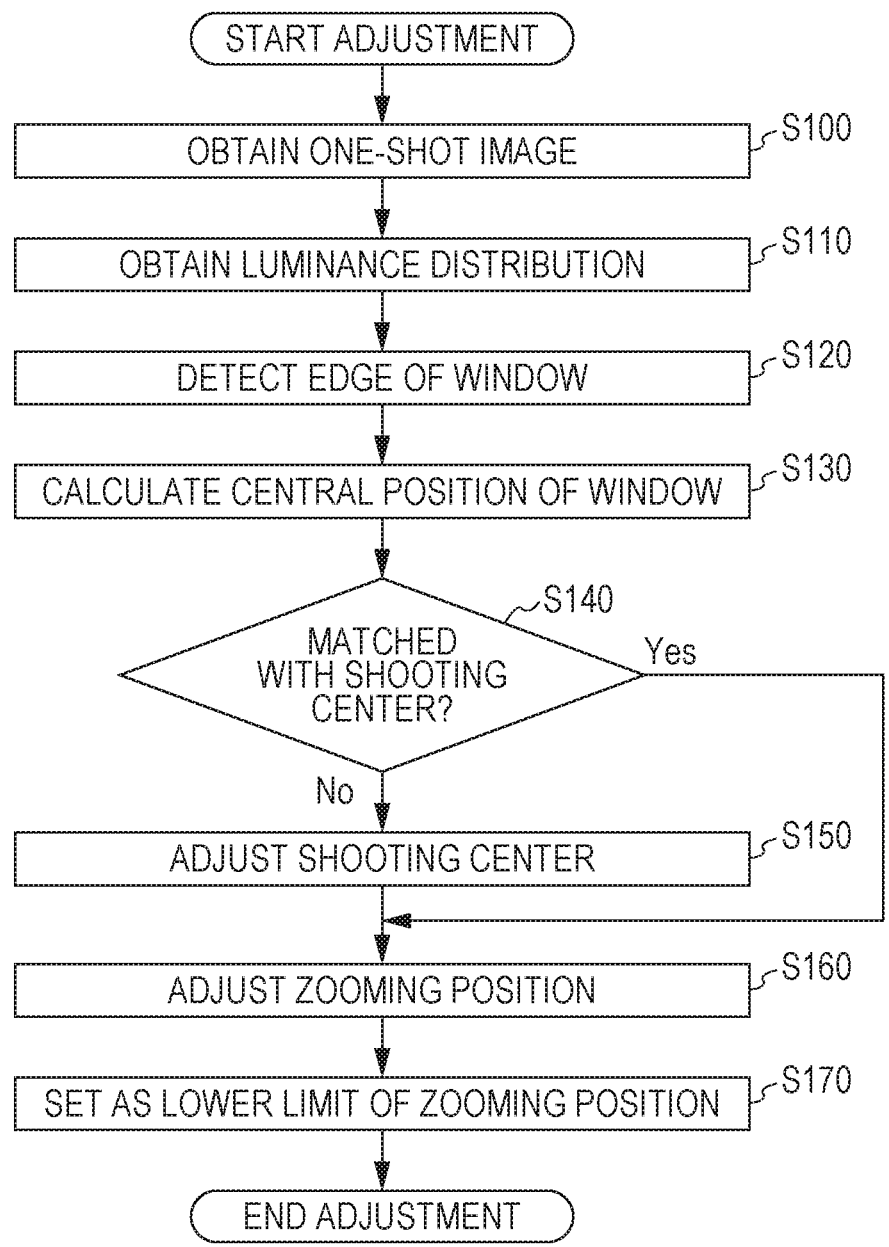
FIG. 2 is a flow chart illustrating an exposure control sequence according to the first exemplary embodiment.
Figure 3:
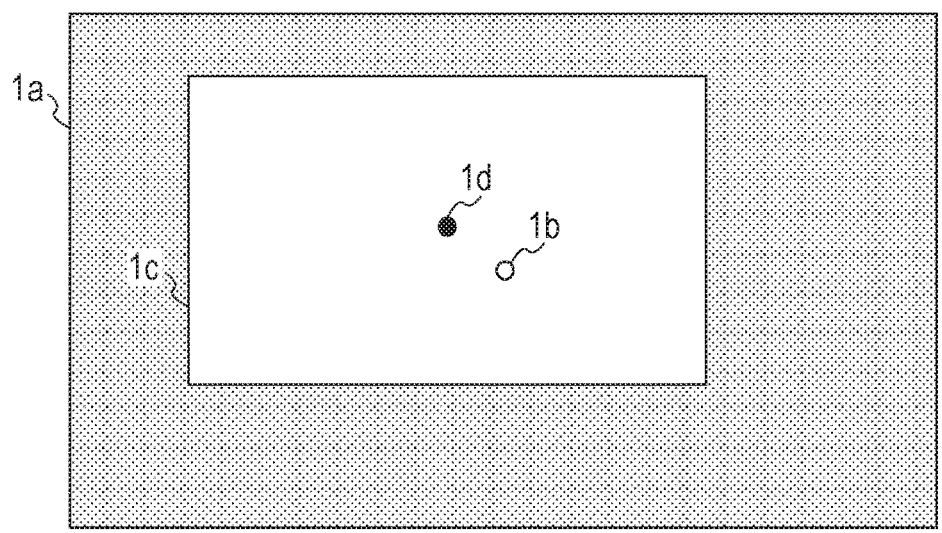
FIG. 3 illustrates an example of a one-shot image according to the first exemplary embodiment.

An exposure adjustment sequence according to the present exemplary embodiment will be described with reference to FIG. 2. At the start of the exposure adjustment sequence, the image pickup apparatus 1 starts the shooting. In S100, the image pickup apparatus 1 obtains a one-shot image to obtain an initial shooting situation. According to the present exemplary embodiment, since a shape of the window 10 is a rectangular shape that is the same shape as the shooting frame 1a, it is possible to obtain the one-shot image as illustrated in FIG. 3. The shooting frame 1a indicates a shooting range of the image pickup apparatus 1 and is determined on the basis of shooting settings of the lens unit 100, the image pickup unit 110, and the image pickup apparatus 1, and the like. A shooting frame center 1b indicates a central position of the shooting frame 1a. A window frame 1c indicates an edge of the window 10. A window frame center 1d indicates a central position of the window frame 1c. The image pickup apparatus 1 converts a shot scene into an image signal through the lens unit 100 and the image pickup unit 110 to be transmitted to the image processing unit 120.

Figure 4:
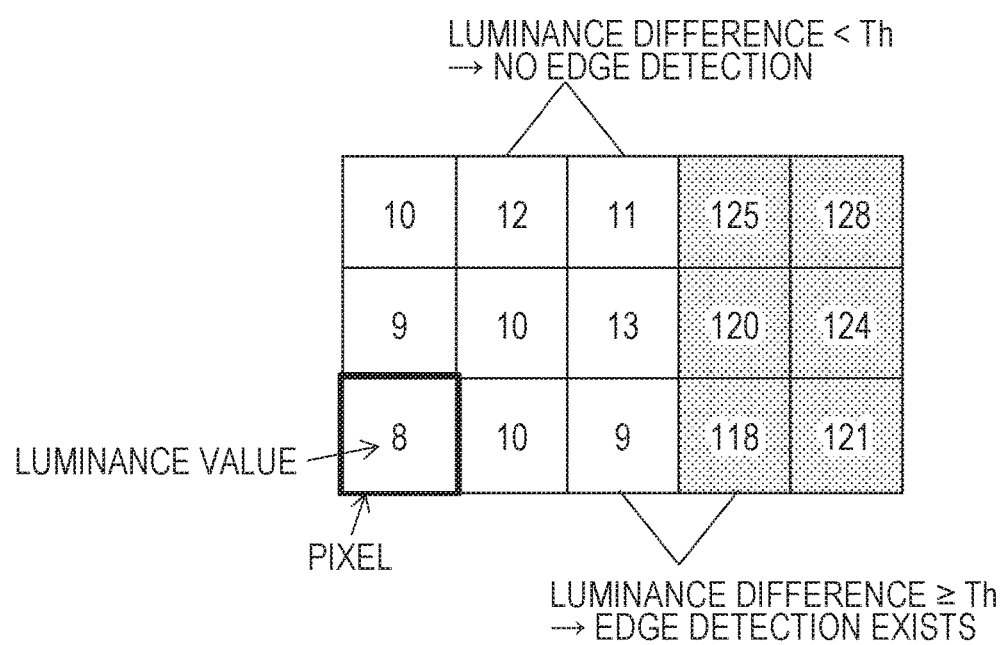
FIG. 4 illustrates an example of an edge detection method.

In S110, the luminance distribution of the one-shot image obtained by the image processing unit 120 is obtained. The image processing unit 120 processes the image signal transmitted from the image pickup unit 110 in accordance with an initial setting of the image processing and generates luminance distribution information of the one-shot image to be transmitted to the edge detection unit 130. In S120, the edge detection unit 130 detects the edge from the luminance distribution information of the one-shot image and calculates the window frame 1c. As a method for the edge detection, for example, a difference in luminance values of adjacent pixels is used (see FIG. 4). As illustrated in FIG. 4, the luminance values of the respective pixels are digitalized by the image processing unit 120, and when the luminance difference between the adjacent pixels is a certain value (which is denoted by Th in FIG. 4) or higher, it is detected that the edge exists. As described above, according to the present exemplary embodiment, the edge detection is performed to calculate the window frame 1c. Since the luminance value of the edge part of the window 10 corresponds to a part where inside and outside of the accessory 2 are shot, it is supposed that the luminance difference becomes a significantly large value. A user specifies Th in accordance with the above-described aspects and a use environment. Specifically, for example, the user specifies Th by a numeric value such as "100" or a picture indicating an image where the numeric value such as "100" is visualized (image obtained by aligning two grayscale pictures, for example). According to the present exemplary embodiment, since the edge detection unit 130 can detect edges of four sides, the window frame 1c is created by connecting the edges with one another and transmitted to the control calculation unit 140.

In S130, the control calculation unit 140 calculates a window center 1d from the window frame 1c obtained in S120. A calculation method for the central position includes, for example, a method of calculating the central position from an intersecting point of diagonal lines of the window frame 1c. In S140, it is determined on whether or not the window center 1d obtained in S130 by the control calculation unit 140 is matched with the shooting frame center 1b. In a case where the window center 1d is matched with the shooting frame center 1b, since the panning/tilting position of the lens unit 100 does not need to be changed, the flow skips the processing in S150 and shifts to S160. In a case where the window center 1d is not matched with the shooting frame center 1b, since the panning/tilting position of the lens unit 100 is to be adjusted, the control calculation unit 140 calculates a displacement amount and transmits an adjustment value of the panning/tilting position to the lens driving unit 160.

In S150, the panning/tilting position of the lens unit 100 is set on the basis of the adjustment value received by the lens driving unit 160 from the control calculation unit 140. In S160, the lens driving unit 160 performs an adjustment of the zooming position such that the window frame 1c is matched with the shooting frame 1a. Since the window center 1d is matched with the central position of the shooting frame 1a by the sequence up to S150, it is possible to perform the adjustment by moving the zooming position to a telescope side.

In S170, a storage unit mounted to the lens driving unit 160 stores the zooming position set in S160 and sets a lower limit of the zooming position control to a wide-angle side. Since an outer side of the window 10 is an unused part for performing the exposure adjustment, it is possible to set an appropriate exposure while this part does not enter the shot image (the shooting frame 1a). The exposure adjustment sequence according to the present exemplary embodiment is ended as described above. How the luminance value in the shot image is used to perform the photometry and exposure control may be determined depending on the situation. For example, when the user desires to regard the luminance value of the central part as important, the calculation is performed by assigning a large weight to the luminance value of the relevant part, and the exposure adjustment unit 150 performs the exposure adjustment on the basis of the calculated value. It should be noted that, in this step, the panning/tilting position or the rolling position set in S150 is stored in addition to the zooming position set in S160, and the driving range may be restricted similarly as in the zooming position control on the basis of the stored contents. In addition, a range for performing tracking at the time of a tracking operation for changing the panning/tilting position in accordance with a movement of the object may be restricted on the basis of the stored range.

It should be noted that the processing of the exposure adjustment sequence illustrated in this flow chart is performed after the start-up of the image pickup apparatus 1 or the like. As a result, the edge detection does not need to be repeatedly performed, and the control loads can be reduced. In addition, the processing of the exposure adjustment sequence illustrated in this flow chart may be separately prepared as an adjustment mode in addition to a normal mode in which the normal exposure adjustment processing is performed. Switching of the respective modes can be performed by using the user interface. It should be noted that, in the normal mode, in a case where the already set zooming position is stored, the exposure adjustment processing is performed in accordance with the stored zooming position. In a case where the zooming position is not stored, the edge detection operation or the like is not executed, and the operation is performed on the basis of the zooming position set by the user.

As described above, the present exemplary embodiment relates to the technological example of the exposure control when the image pickup apparatus such as the camera to which the panning/tilting/zooming drive apparatus is mounted is put in the accessory to be used. It should be noted that the exposure control has been particularly illustrated according to the present exemplary embodiment, but the present exemplary embodiment can also be applied to focal point detection control in the lens unit 100 and white balance control.

Second Exemplary Embodiment

Figure 5:
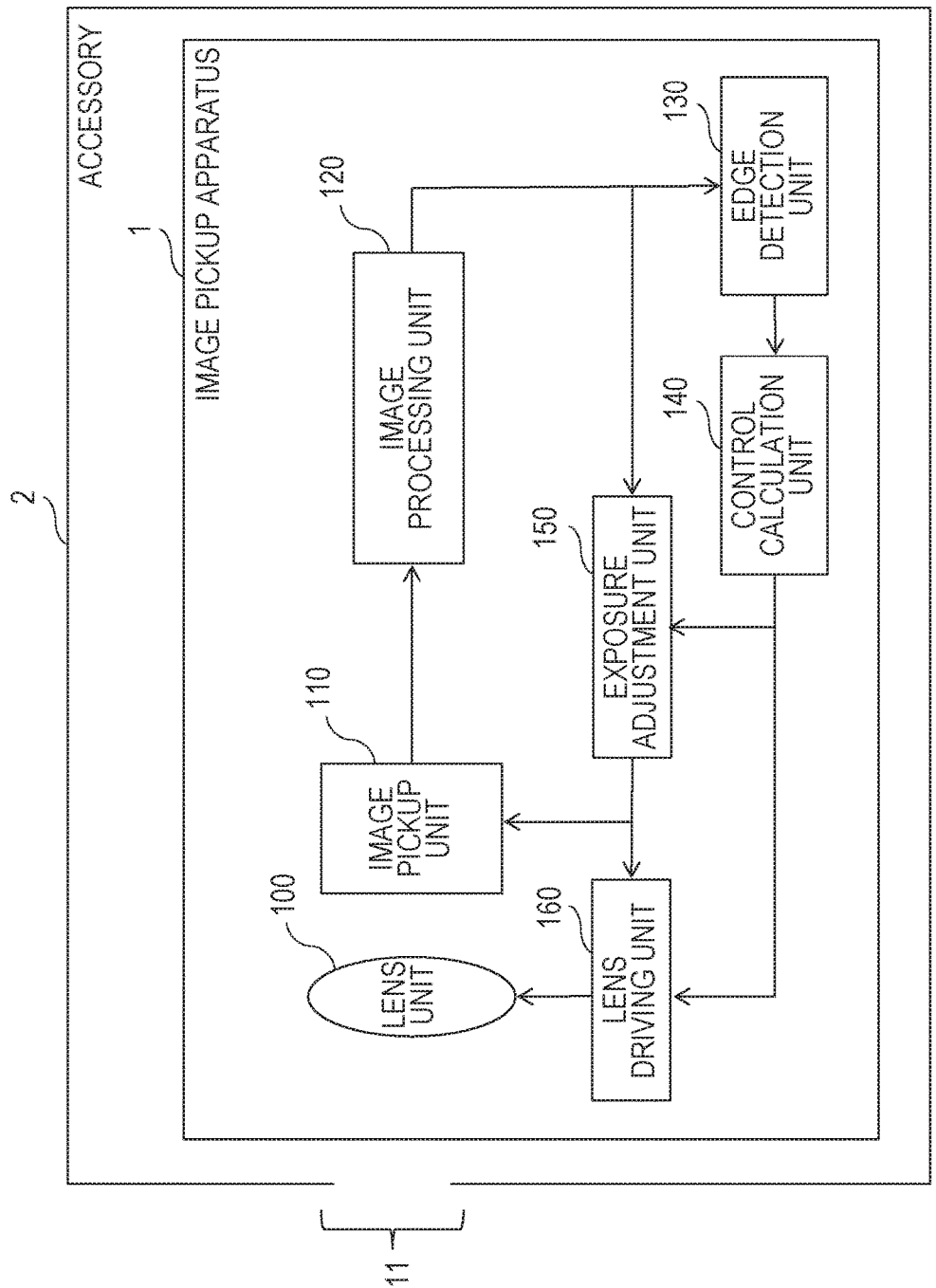
FIG. 5 illustrates an overall configuration according to a second exemplary embodiment.

Next, a second exemplary embodiment of the disclosure will be described with reference to FIG. 5. Here, descriptions will be given of the exposure control in a case where the shape of the window is not matched with the shape of the shooting frame will be described. According to the present exemplary embodiment, unlike the first exemplary embodiment, the outer side of the window enters the shooting frame when only the panning/tilting/zooming operation is performed. Therefore, a sequence for performing the exposure adjustment in the window frame is to be added. According to the present exemplary embodiment, the image pickup apparatus 1 has the similar components, but a bus for transmitting the shape of the window from the control calculation unit 140 to the exposure adjustment unit 150 is added. The accessory 2 is similar to that of the first exemplary embodiment, but a window 11 may take any shape.

Figure 6:
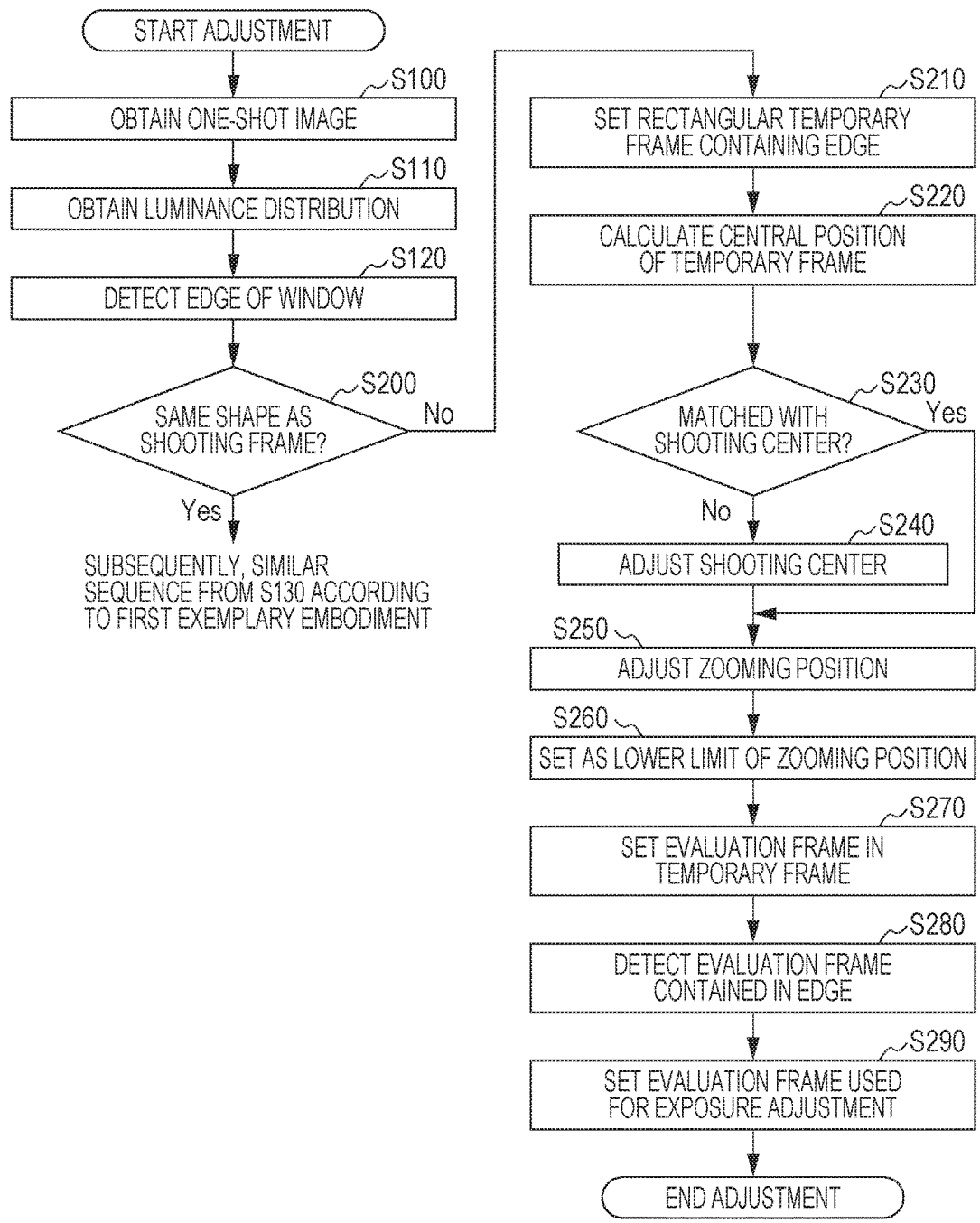
FIG. 6 is a flow chart illustrating the exposure control sequence according to the second exemplary embodiment.
Figure 7:
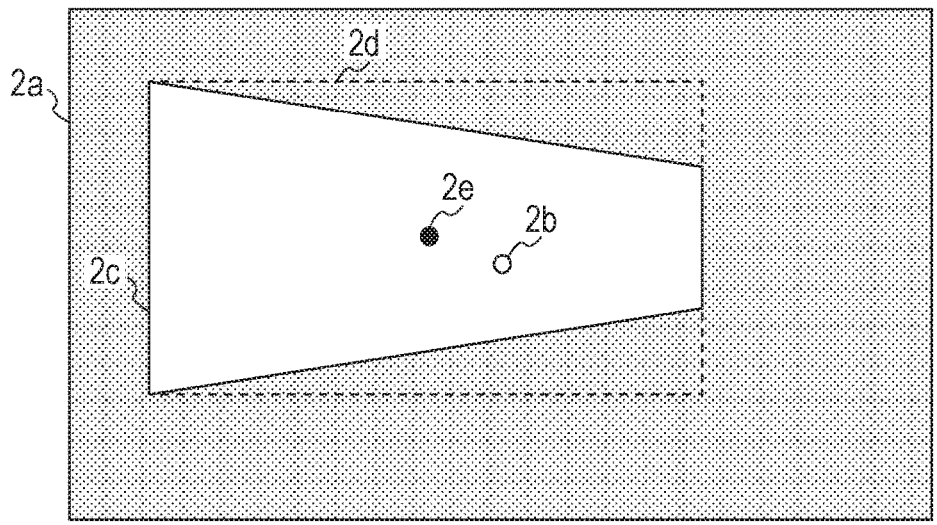
FIG. 7 illustrates another example of the one-shot image according to the second exemplary embodiment.

The exposure adjustment sequence according to the present exemplary embodiment will be described with reference to FIG. 6. The processing from the start to S120 in the exposure adjustment sequence is similar to that of the first exemplary embodiment. According to the present exemplary embodiment, no matter what shape the window 11 takes, the image pickup apparatus 1 obtains the one-shot image as illustrated in FIG. 7, for example.

In S200, the control calculation unit 140 determines from the edge detection information obtained in S120 whether or not a window frame 2c and a shooting frame 2a have the same shape. According to the present exemplary embodiment, no matter what shape the window 11 takes, the control calculation unit 140 obtains the window frame 2c by connecting the edges detected by the edge detection unit 130 to one another. In a case where the window frame 2c is matched with the shooting frame 2a, the flow is similar in the sequence from S130 and the subsequent steps according to the first exemplary embodiment. In a case where the window frame 2c is not matched with the shooting frame 2a, the flow shifts to the sequence in S210. In S210, a temporary frame 2d is set from the window frame 2c obtained by the control calculation unit 140 in S200 so as to contain the window frame 2c. It is possible to perform the setting of the temporary frame 2d, for example, by providing a rectangular frame so as to contact with vertices or sides on the left, right, top and bottom of the window frame 2c. It should be noted however that the shooting frame 2a and the temporary frame 2d have similar figures in this case. When the shooting frame 2a and the temporary frame 2d do not have the similar figures, another temporary frame having a similar shape can also be set so as to be inscribed or circumscribed with the temporary frame 2d as described according to the above-described first exemplary embodiment.

In S220 to S250, the processing in S130 to S160 according to the first exemplary embodiment is performed with respect to the temporary frame 2d. It should be noted however that the temporary frame 2d is not necessarily matched with the shape of the shooting frame 2a. Therefore, as described above, the adjustment of the zooming position may be performed in some cases to such a position that the two side on the top and bottom of the temporary frame 2d or the two side on the left and right of the temporary frame 2d are matched with the shooting frame 2a, for example. In S260, the zooming position set by the control calculation unit 140 in S250 is stored, and a lower limit of the zooming position control to the wide-angle side is set. A state is established by the sequence up to S260 in which a ratio of the window 11 occupied in the shooting range becomes the highest. The control calculation unit 140 transmits information of the set temporary frame 2d to the exposure adjustment unit 150, and the flow shifts to S270.

Figure 8:
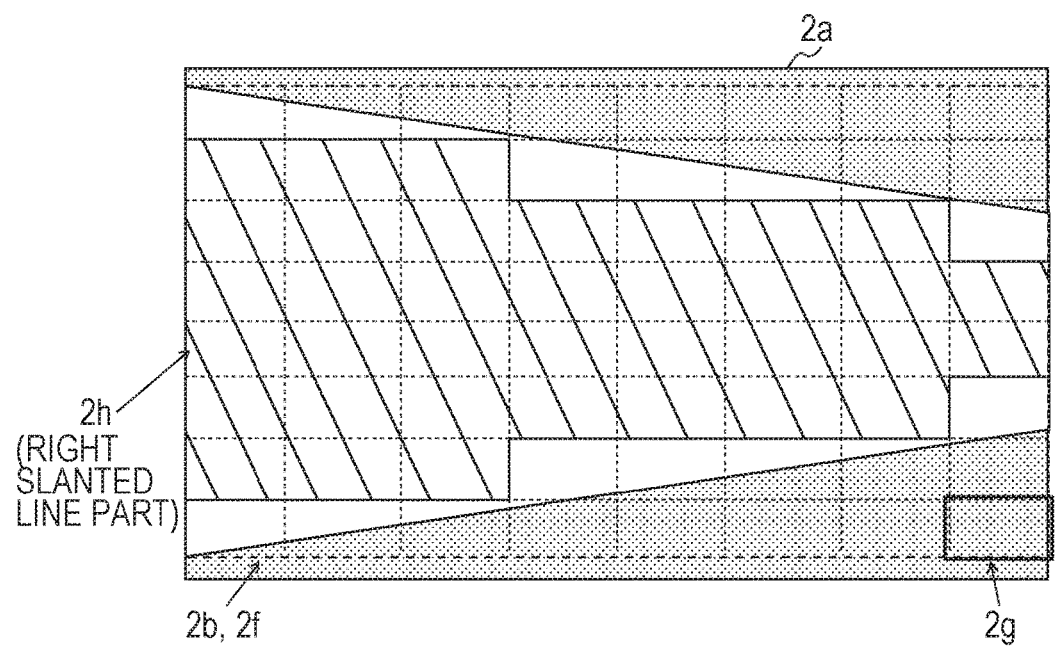
FIG. 8 illustrates a dividing method of an evaluation frame according to the second exemplary embodiment.

In S270, the exposure adjustment unit 150 performs a setting of an evaluation frame corresponding to a target of the exposure adjustment. As illustrated in FIG. 8, since the evaluation frame is generally set to have a rectangular shape, an initial evaluation frame 2f is set so as to be matched with the temporary frame 2d containing the window 11. Thereafter, the exposure adjustment unit 150 performs dividing processing with respect to the initial evaluation frame 2f. The number of divisions is set by the user as a numeric value that can be set by the image pickup apparatus 1, for example. As the number of divisions is higher, the accuracy of the exposure adjustment is higher. After the end of the dividing processing, the flow shifts to S280.

In S280, the detection is performed with respect to an object contained in the window 11 in an evaluation frame 2g where the exposure adjustment unit 150 performs the dividing processing in S270. Since the lens unit 100 is the lens provided with the panning/tilting function, the lens unit 100 is supposed to be used while the object is set to be located in the center of the image. For this reason, the exposure does not need to be adjusted in the vicinity of a border of the window 11. From the above-described aspects, in S280, the exposure adjustment unit 150 detects only the evaluation frame completely contained in the window 11, and the flow shifts to S290.

In S290, the evaluation frame detected by the exposure adjustment unit 150 in S280 is set as a final evaluation frame 2h used for the exposure adjustment. As a result of the above-described sequence, since it is possible to detect the evaluation frame in which the range of the window 11 occupied in the shooting range is maximized and which is also optimal to the exposure adjustment, the appropriate exposure at the high accuracy can be obtained. The exposure adjustment sequence according to the present exemplary embodiment is ended as described above. At this time too, how the luminance values in the respective evaluation frames are used to perform the photometry and exposure control may be determined depending on the situation. For example, when the user desires to regard the luminance value of the central part as important, the calculation is performed by assigning a large weight to the luminance value of the relevant part, and the exposure adjustment unit 150 performs the exposure adjustment on the basis of the calculated value.

Third Exemplary Embodiment

Figure 9:
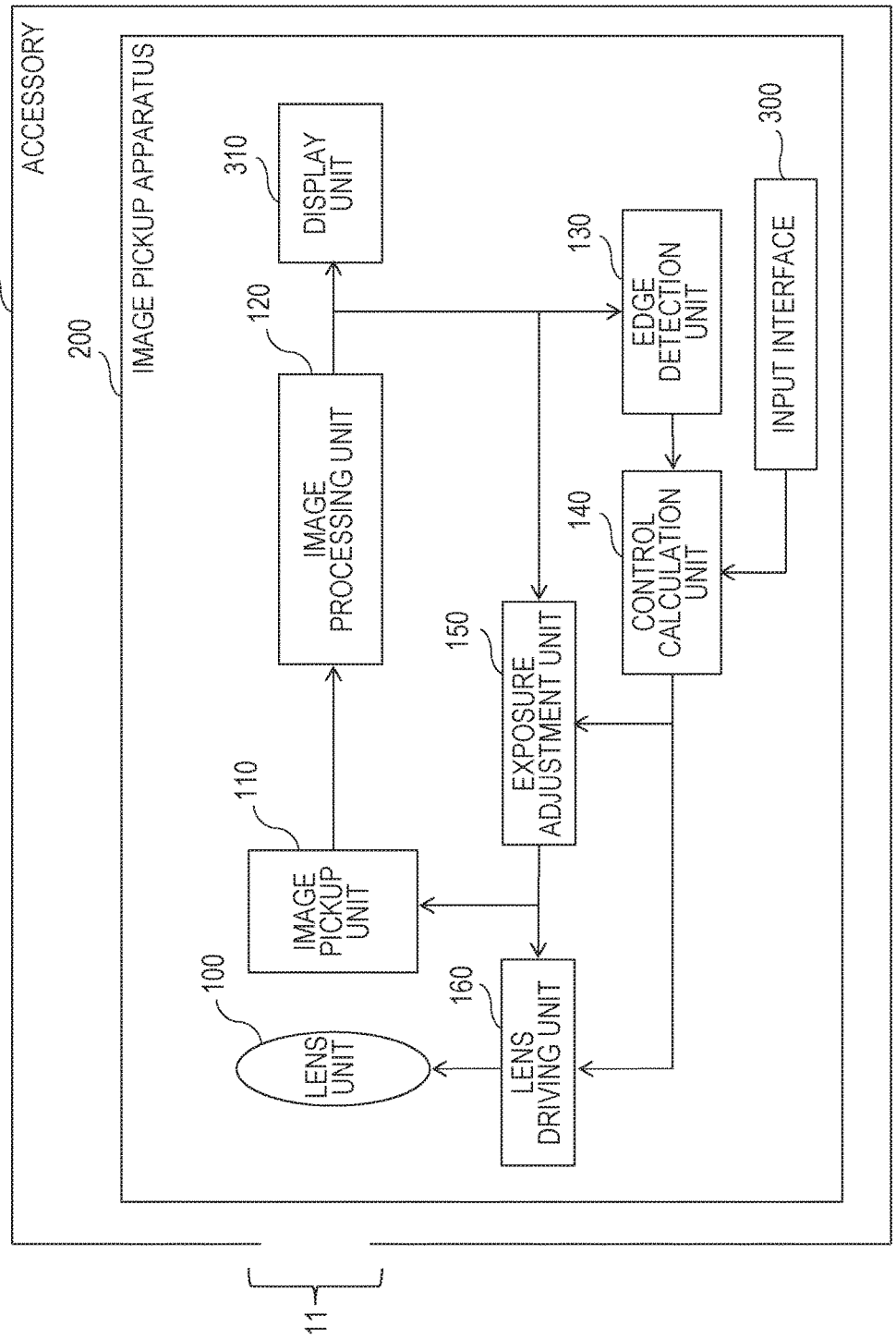
FIG. 9 illustrates an overall configuration according to a third exemplary embodiment.

Next, a third exemplary embodiment of the disclosure will be described with reference to FIG. 9. Here, descriptions will be given of the exposure control in a case where the window 11 is not fit into the shooting frame. According to the present exemplary embodiment, a case where the window is not fit into the shooting frame includes, for example, a case where the window 11 is substantially large and a case where the shooting is to be performed on the telescope side. That is, according to the present exemplary embodiment, the four sides of the edges of the window frame are not obtained from the shot image, and the temporary frame is not set unlike the second exemplary embodiment. For this reason, according to the present exemplary embodiment, a sequence is used in which the user specifies the temporary frame. According to the present exemplary embodiment, the accessory 2 and the window 11 have configurations similar to those of the second exemplary embodiment. An image pickup apparatus 200 have a similar configuration to the image pickup apparatus 1 according to the above-described second exemplary embodiment except for an input interface 300 and a display unit 310. The input interface 300 converts an input from the user into a control signal. The input interface 300 is constituted, for example, by a mouse or a touch panel.

The display unit 310 displays the image signal received from the image processing unit 120, the set values in the image pickup apparatus 200, and the like as image information for the user. The display unit 310 is constituted by a liquid crystal display (LCD) or the like. According to the descriptions with reference to FIG. 9, the input interface 300 and the display unit 310 are structured to be contained in the image pickup apparatus 200 but may be connected to the outer side of the image pickup apparatus 200. In addition, the input interface 300 and the display unit 310 may be structured as a single combined module.

Figure 10:
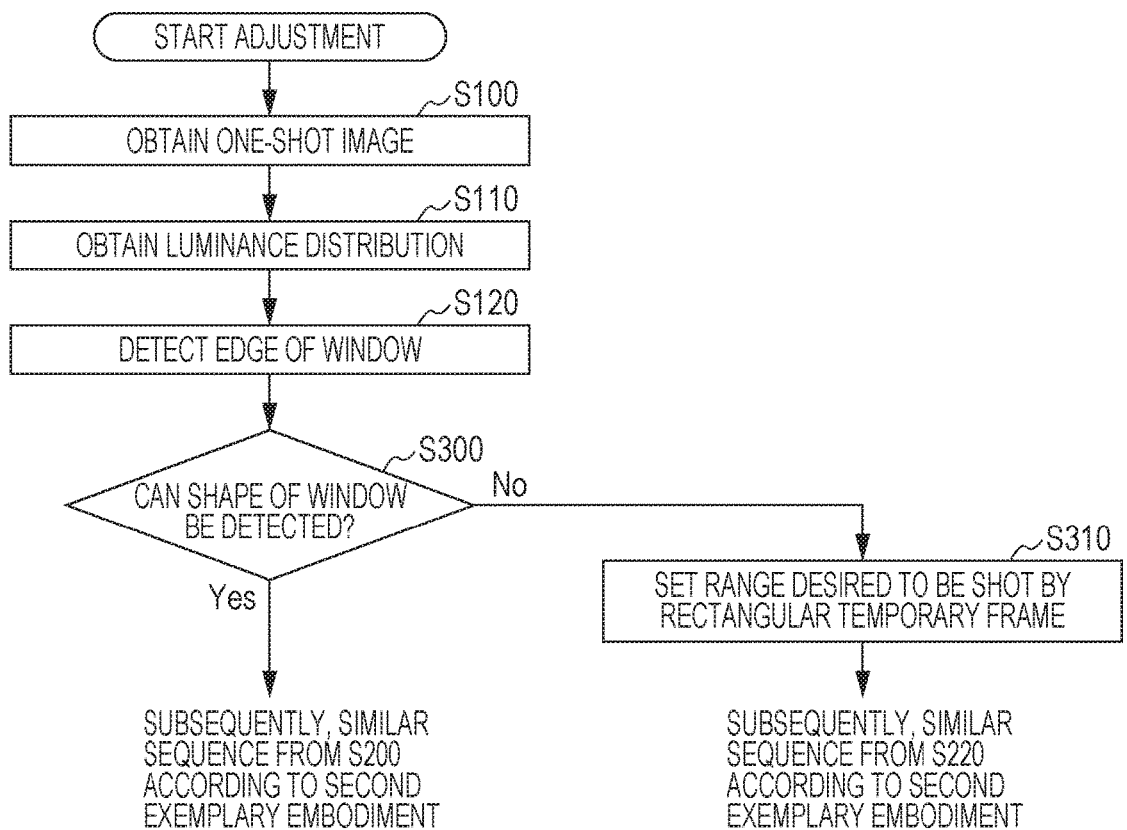
FIG. 10 is a flow chart illustrating the exposure control sequence according to the third exemplary embodiment.
Figure 11:
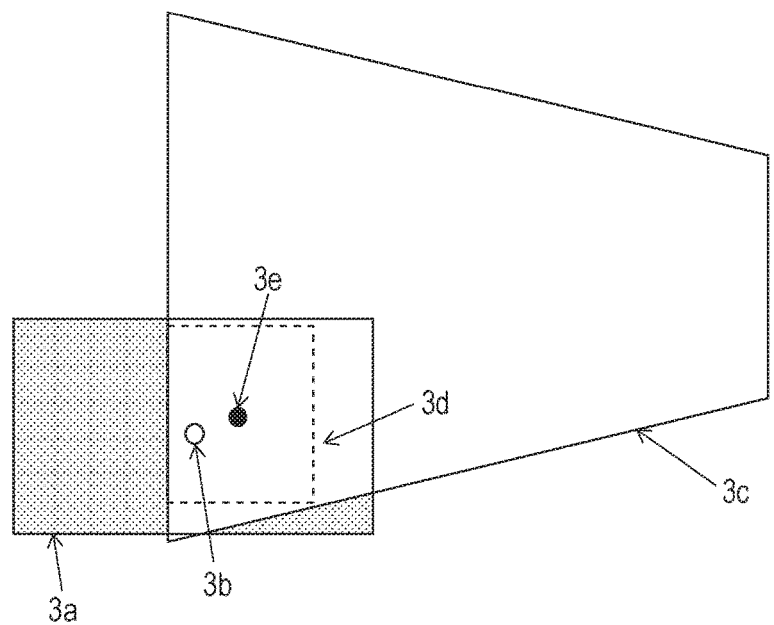
FIG. 11 illustrates another example of the one-shot image according to the third exemplary embodiment.
Figure 12:
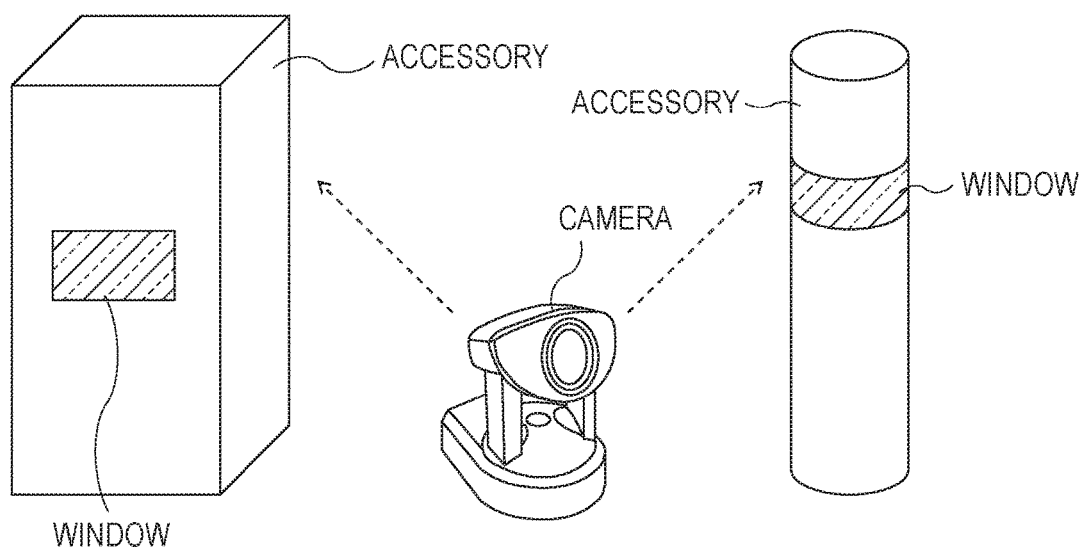
FIG. 12 illustrates a related-art technology.

The exposure adjustment sequence according to the present exemplary embodiment is illustrated in FIG. 10. The processing from the start to S120 in the exposure adjustment sequence is similar to the first exemplary embodiment. According to the present exemplary embodiment, the one-shot image as illustrated in FIG. 11 is obtained, for example. In S300, it is determined whether or not the control calculation unit 140 can detect a window frame 3c. In a case where the window frame 3c can be detected, the flow is similar to the sequence in S200 and the subsequent steps according to the second exemplary embodiment. In a case where the window frame 3c is not detected, the flow shifts to S310. It should be noted that, when a contrast decreases at night or in other occasions, the window frame 3c is not detected in some cases. In the above-described case, the processing may be returned to S100 so that the edge detection is performed again after an elapse of a predetermined period of time instead of shifting to S310.

In S310, a temporary frame 3d is set in accordance with the shooting range specification the user. The display unit 310 displays the image signal transmitted from the image processing unit 120 as the image for the user, and the user specifies the range where the shooting is to be performed via the input interface 300. A specification method includes, for example, a method of performing a specification with respect to a display image, a method of performing a setting by specifying coordinates, and the like. The input interface 300 transmits the information specified from the user to the control calculation unit 140. The control calculation unit 140 sets the temporary frame 3d in accordance with the transmitted information, and subsequently, the processing is performed by the sequence similar to S220 according to the second exemplary embodiment. At this time, there is an assumption that "since the resolution of the lens is higher as the position is closer to the center, the user probably moves the position where the user desires to perform the monitoring or shooting to a position in the vicinity to the center of the shooting frame in the panning/tilting device". Therefore, "the center of the range where the user desires to perform the shooting" is substantially set as "a shooting frame center 3b". Alternatively, a mode may be adopted from the viewpoint of an increase in the accuracy of the exposure control by "setting a large temporary frame" in which "a shooting frame 3a is moved towards the window frame 3c" as compared with the configuration illustrated in FIG. 11 under the control of the panning/tilting device.

As a result of the above-described sequence, the range where the user desires to perform the shooting which is occupied in the shooting range can be maximized, and also the evaluation frame optimal to the exposure adjustment can be detected, so that the appropriate exposure at the high accuracy can be obtained. It should be noted however that the shooting frame 3a and the temporary frame 3d have similar figures also in the case of the present exemplary embodiment. When the shooting frame 3a and the temporary frame 3d do not have the similar figures, another temporary frame having a similar figure is set as mentioned according to the above-described exemplary embodiment, or the shooting frame is adjusted to be zoomed to have a similar figure with respect to the temporary frame. In addition, according to the present exemplary embodiment, a mode may be adopted in which the image signal including the edge is displayed as an image for the user irrespective of the shape of the edge, and the user is asked to specify the range where the user desires to perform the shooting via the input interface 300. That is, while the window frame or the temporary frame is not automatically set on the apparatus side, the user may set the frame by taking the shape of the edge into account.

According to the present exemplary embodiment, the example has been illustrated in which the temporary frame is specified by using the input interface 300, but the configuration is not limited to this. For example, a shape change of the edge may be regularly separately discriminated in addition to the input from the input interface 300 after the temporary frame is once set, and the temporary frame may be set again. As a result, it is also possible to perform the appropriate setting in a case where an obstacle invades into the screen or a case where the window frame is displaced due to an impact or the like. It should be noted that, in a case where an edge is generated within the image by the obstacle other than the window frame, a detection unit configured to detect the object within the image may be further provided, and the edge of the obstacle may be detected in addition to the window frame.

The exemplary embodiments of the disclosure have been described above, but the disclosure is not limited to these exemplary embodiments, and various modifications and alterations can be made within the scope of the gist thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-173831 filed Sep. 6, 2016, which is hereby incorporated by reference herein in its entirety.

What is claimed is:

1. An apparatus comprising:
   an image pickup unit configured to focus light from an object by a lens unit to generate an image signal;
   a controller having a processor which executes instructions stored in a memory, the controller being configured to function as:
   an image processing unit configured to generate an image from the image signal;
   an edge detection unit configured to detect, in the image, an edge of a window frame of an accessory that accommodates the apparatus, the edge of the window frame intercepting the light from the object;
   an adjustment unit configured to drive the lens unit and adjust at least one of a zooming position, a panning position, and a tilting position based on a detection result of the edge detection unit; and
   an exposure adjustment unit configured to perform an exposure adjustment excluding an area at which the light from the object is intercepted by the edge, based on the detection result in the image at the at least one position adjusted by the adjustment unit.

2. The apparatus according to claim 1,
   wherein the edge detection unit detects the edge based on a luminance of the image signal in the image, and
   wherein the adjustment unit drives the lens unit and performs the adjustment such that an area is matched with or contained in a shooting range of the image or an area covers the shooting range of the image.

3. The apparatus according to claim 2,
   wherein the edge detection unit includes a calculation unit configured to determine the area based on information of the edge and obtain a central position of the area, and
   wherein the area is an area based on the window frame where four sides are defined by the edges or an area based on a temporary frame where at least part is defined by the edge.

4. The apparatus according to claim 3, wherein, in a case where the area based on the window frame where the four sides are defined by the edges and the shooting range of the image do not have similar figures, the calculation unit sets the temporary frame so as to be inscribed with at least part of the area based on the window frame to be contained in the area based on the window frame or sets the temporary frame so as to be circumscribed with at least part of the area based on the window frame to cover the area based on the window frame.

5. The apparatus according to claim 4, wherein, in a case where the area based on the window frame where the four sides are defined by the edges or the temporary frame and the shooting range of the image do not have similar figures, the adjustment unit adjusts the shooting range of the image so as to be inscribed with at least part of the area based on the window frame or the temporary frame to be contained in the area based on the window frame or the temporary frame or adjusts the shooting range of the image so as to be circumscribed with at least part of the area based on the window frame or the temporary frame to cover the area based on the window frame or the temporary frame.

6. The apparatus according to claim 1, wherein the adjustment unit adjusts the zooming position after the lens unit is driven in one or both of a panning direction and a tilting direction.

7. The apparatus according to claim 1, further comprising a memory that stores at least one of the adjusted zooming position, the adjusted panning position, the adjusted tilting position, and a rolling position.

8. The apparatus according to claim 7, further comprising an acceptance unit configured to accept an instruction by a user to drive at least one of the zooming position, the panning position, the tilting position, and the rolling position of the lens unit,
   wherein the adjustment unit restricts a driving range of the lens unit accepted by the acceptance unit based on at least one of the zooming position, the panning position, the tilting position, and the rolling position stored in the memory.

9. The apparatus according to claim 1, wherein the exposure adjustment unit includes a first unit configured to divide a shooting range of the image into evaluation frames for the exposure adjustment and also a second unit configured to detect the evaluation frame contained in an area defined by the edge based on the window frame, and sets the contained evaluation frame as a final evaluation frame used for the exposure adjustment.

10. The apparatus according to claim 1, wherein the edge detection unit further includes an object detection unit configured to detect an edge of an object in addition to the window frame.

11. The apparatus according to claim 1, wherein the edge detection unit performs the edge detection after an elapse of a predetermined period of time in a case where the edge is not detected.

12. An apparatus comprising:
an obtaining unit configured to obtain an image signal from an image pickup unit that picks up an image of an object by a lens unit;
a determination unit configured to determine an edge area based on a window frame of an accessory that covers the image pickup unit in the image signal; and
a control unit configured to control at least one of a zooming position, a panning position, a tilting position, and a rolling position of the lens unit,
wherein the control unit determines an obtaining condition for obtaining the image signal with respect to the image pickup unit based on the edge area.

13. The apparatus according to claim 12, wherein the obtaining condition includes at least one of a focal position of the lens unit, an exposure condition, and a white balance condition.

14. A method comprising:
generating an image signal while light from an object is focused by a lens unit;
generating an image from the image signal;
detecting, in the image, an edge of a window frame of an accessory that accommodates an image pickup apparatus, the edge of the window frame intercepting the light from the object;
driving the lens unit and adjusting at least one of a zooming position, a panning position, and a tilting position based on a detection result in the detecting; and
performing an exposure adjustment excluding an area at which the light from the object is intercepted by the edge, in the image at the adjusted position based on the detection result.

15. The method according to claim 14,
wherein the detecting detects the edge based on a luminance of the image signal in the image, and
wherein the adjusting further includes performing the adjustment such that an area is matched with or contained in a shooting range of the image or an area covers the shooting range of the image.

16. The method according to claim 14, wherein the adjusting adjusts the zooming position after the lens unit is driven in one or both of a panning direction and a tilting direction.

17. The method according to claim 14, further comprising storing at least one of the adjusted zooming position, the adjusted panning position, the adjusted tilting position, and a rolling position in a storing unit.

18. The method according to claim 14, wherein the performing the exposure adjustment further includes:
dividing a shooting range of the image into evaluation frames for the exposure adjustment,
detecting the evaluation frame contained in an area defined by the edge based on the window frame, and
setting the contained evaluation frame as a final evaluation frame used for the exposure adjustment.

19. The method according to claim 14, wherein the detecting the edge further includes detecting an edge of an object in addition to the window frame.

20. The method according to claim 14, wherein the detecting the edge further includes performing the edge detection after an elapse of a predetermined period of time in a case where the edge is not detected.

* * * * *